US 9,475,501 B2

(12) United States Patent
Flehmig et al.

(10) Patent No.: US 9,475,501 B2
(45) Date of Patent: Oct. 25, 2016

(54) METHOD FOR ASCERTAINING THE STRESS LEVEL OF THE DRIVER

(71) Applicant: Robert Bosch GmbH, Stuttgart (DE)

(72) Inventors: Folko Flehmig, Stuttgart (DE); Claus Marberger, Weil Der Stadt (DE); Thomas Gussner, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/574,569

(22) Filed: Dec. 18, 2014

(65) Prior Publication Data
US 2015/0175169 A1 Jun. 25, 2015

(30) Foreign Application Priority Data

Dec. 19, 2013 (DE) .................. 10 2013 226 766
Jan. 30, 2014 (DE) .................. 10 2014 201 650

(51) Int. Cl.
| B60W 40/08 | (2012.01) |
| B62D 6/00 | (2006.01) |
| B60T 7/12 | (2006.01) |
| B60T 7/14 | (2006.01) |
| B60T 7/22 | (2006.01) |
| B60T 17/18 | (2006.01) |
| B60W 50/08 | (2012.01) |
| B60K 28/02 | (2006.01) |
| B60W 30/182 | (2012.01) |
| B60W 40/09 | (2012.01) |
| B60W 50/00 | (2006.01) |

(52) U.S. Cl.
CPC .............. *B60W 40/08* (2013.01); *B60K 28/02* (2013.01); *B60T 7/12* (2013.01); *B60T 7/14* (2013.01); *B60T 7/22* (2013.01); *B60T 17/18* (2013.01); *B60W 30/182* (2013.01); *B60W 40/09* (2013.01); *B60W 50/087* (2013.01); *B62D 6/00* (2013.01); *B62D 6/007* (2013.01); *B60T 2201/022* (2013.01); *B60W 2040/0872* (2013.01); *B60W 2050/0083* (2013.01); *B60W 2540/22* (2013.01); *B60W 2550/10* (2013.01); *B60W 2550/402* (2013.01)

(58) Field of Classification Search
CPC .. B60W 40/08; B60W 2040/087; B62D 6/00
USPC .......................................................... 701/41
See application file for complete search history.

(56) References Cited

U.S. PATENT DOCUMENTS

| 4,543,957 | A | * | 10/1985 | Friedman et al. ............. 600/300 |
| 2005/0137753 | A1 | * | 6/2005 | Basson .................. G01C 21/26 701/1 |
| 2014/0067250 | A1 | * | 3/2014 | Bone et al. ..................... 701/301 |
| 2014/0300740 | A1 | * | 10/2014 | Fujioka ........................ 348/148 |
| 2015/0120124 | A1 | * | 4/2015 | Bartels et al. .................. 701/23 |

FOREIGN PATENT DOCUMENTS

DE 102004027085 12/2005

* cited by examiner

Primary Examiner — Mussa A Shaawat
Assistant Examiner — Yazan Soofi
(74) Attorney, Agent, or Firm — Norton Rose Fulbright US LLP

(57) ABSTRACT

In a method for ascertaining the stress level of the driver, the setpoint trajectory of the vehicle is ascertained and compared to the actual trajectory. A higher stress level is inferred from an increasing frequency and/or magnitude of the deviation of the actual trajectory from the setpoint trajectory.

25 Claims, 1 Drawing Sheet

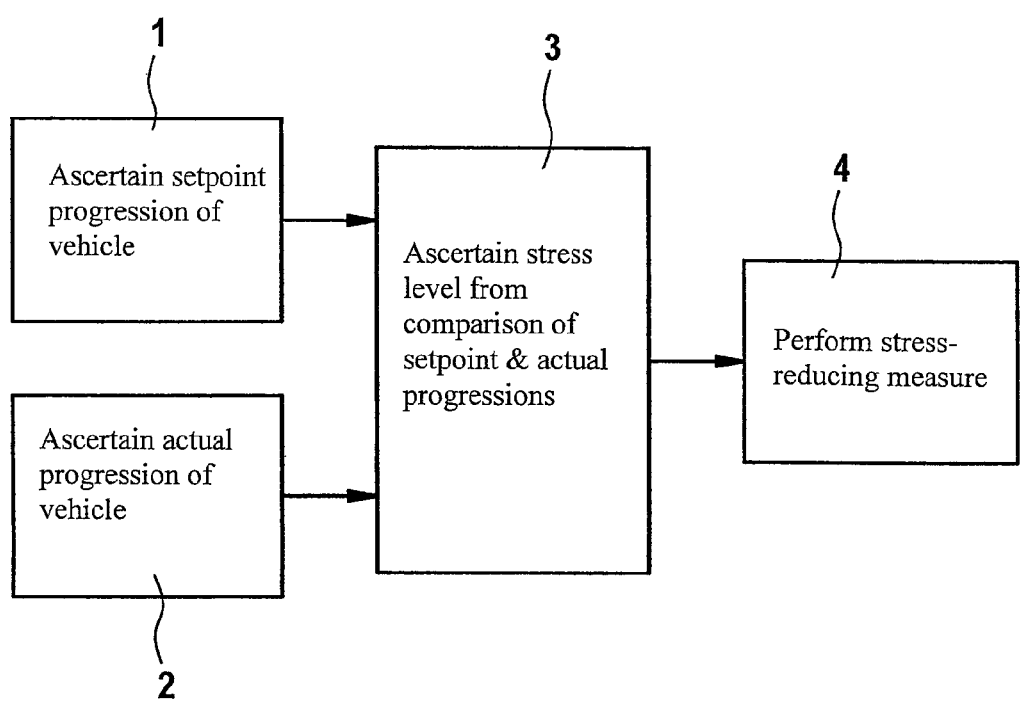

METHOD FOR ASCERTAINING THE STRESS LEVEL OF THE DRIVER

FIELD OF THE INVENTION

The present invention relates to a method for ascertaining the stress level of the driver.

BACKGROUND INFORMATION

German Published Patent Application No. 10 2004 027 085 A1 describes a method for keeping a vehicle inside the lane, in which the instantaneous potential hazard is ascertained based on objective and subjective criteria and measures are taken in steps depending on the extent of an impending danger. The objective hazard situation may be ascertained with the aid of a surroundings sensor system in the vehicle by detecting objects situated on the roadway. The behavior of the driver plays a role with the subjective hazard situation, in particular the present level of fatigue, which is ascertained from the steering activity and/or the driving of the vehicle in the lane. A fatigued state is inferred from only minimal steering and pedal movements, while active participation in traffic is to be inferred from a high steering activity. Depending on the overall potential hazard, influence is exerted in a stepped manner, in which initially only information is provided, subsequently a warning is issued, and finally an active intervention in the vehicle is carried out, for example by actuating a steering actuator.

SUMMARY

It is therefore the object of the present invention to improve the driving safety in a vehicle by ascertaining the instantaneous stress level.

With the aid of the method according to the present invention, it is possible to ascertain the instantaneous stress level of the driver of a vehicle. Measures which result in a reduction of the stress level may be taken as a function of the stress level. In this way, the overall driving safety is significantly increased.

The method for ascertaining the stress level is based on a comparison of the setpoint trajectory of the vehicle, i.e., the progression of the driving lane on which the vehicle is to move at least in sections, to the actual trajectory, i.e., the actual progression of the driving lane of the vehicle. As an alternative to the comparison between the setpoint and actual trajectory of the vehicle, it is also possible to consider a state variable correlating therewith, for example the steering angle, by comparing the setpoint progression and the actual progression of the steering angle. Both the consideration of the trajectory and the consideration of the steering angle involve the vehicle state which is directly attributable to a driver activity.

The setpoint and actual trajectory may also describe the vehicle movement together in the transverse and longitudinal directions, so that additionally a comparison of the setpoint and actual values of the route covered over the time is carried out. As an alternative, it is possible to consider state variables correlating therewith, for example the actuation of the gas and brake pedals.

The stress level is determined from the deviation between the actual and setpoint progression. Here the frequency and/or the magnitude of the deviation is/are ascertained, an increased stress level being inferable from an increasing frequency or magnitude of the deviation. The magnitude or the frequency of the deviation thus represents a degree of the stress level. By taking driver activities into consideration which directly affect the driving of the vehicle, the actual progression may be determined, on which the comparison to the setpoint progression is based.

Stress-reducing measures may be taken as a function of the ascertained stress level. For example, stepped measures may be taken by taking only measures having little impact when an only slightly elevated stress level above an average value is present, and by taking corresponding measures having greater impact when an increased stress level is present. For example, initially only information may be provided or a warning may be issued by displaying the instantaneous stress level to the driver and requesting a behavioral change, for example taking a break. As a next measure, it is possible to directly intervene in the vehicle state, for example by modifying characteristic curves in a unit or a driver assistance system. As the strongest intervention, it is possible to directly intervene in the vehicle state by actuating a unit or a driver assistance system, for example by automatically triggering a braking or steering process.

The stress level may result in excessive driver reactions, whereby the objective hazard situation increases and the risk of an accident is accordingly increased. Under stress, a driver carries out more erratic driving maneuvers, which may manifest themselves in additional or excessive steering movements, but also in an intensified pedal actuation. By comparison, a relaxed driver will display a calm, more uniform manner of driving, which manifests itself in a smaller deviation between the setpoint and actual trajectory or the correlating state variable.

The stress level may be determined from the setpoint-actual comparison of the trajectory or the state variable correlating therewith. For this purpose, for example, the variance or the standard deviation is ascertained, the magnitude of which represents a degree of the stress level. The variance may be determined from the sum of the deviations from the mean value squared:

$$s^2 = \frac{1}{n-1} \sum_{i=1}^{n} (x_i - \bar{x})^2,$$

where n denotes the number of data considered, $x_i$ denotes the respective data value, and $\bar{x}$ denotes the mean value of the data.

In the case of multiple state variables, such as with a trajectory which is defined in the transverse and longitudinal directions, the stress level may be determined as a weighted sum of the variances of the individual state variables.

However, it is also possible to carry out other statistical analyses, with which the deviation of the actual progression from the setpoint progression is established and assessed. In particular, evaluation and assessment methods are advantageous in which both the magnitude of the deviation and the number of deviations in a defined time period are detected and assessed.

The setpoint trajectory, or the state variable correlating therewith, is advantageously determined from measuring data of a surroundings sensor system which is present in the vehicle. The surroundings sensor system may include a video camera, radar, LIDAR or ultrasonic sensors, with which the surroundings in front of, to the side of, or behind the vehicle may be detected. In addition or as an alternative, it is also possible to obtain the actual position of the vehicle and the setpoint trajectory from information of a global positioning system (GPS) including a stored road map. The surroundings sensor system in the vehicle may supply information on a supplementary basis, if necessary, for example about obstacles on the roadway. The setpoint trajectory, or the variable correlating therewith, such as the steering angle progression, is ascertained from this information at least for a defined, preceding route section, and at the same time, the actual progression of the trajectory or of the correlating state variable may be detected.

The comparison between the setpoint and actual progression takes place in a regulating or control unit in which the method steps are carried out, and if necessary, control or output signals are generated in this control unit to carry out the stress-reducing measures. This involves an output of information or a warning to the driver, or a modified setting of a parameter or of a characteristic curve in an adjustable unit of the vehicle or a driver assistance system. The severity of the intervention to be carried out may correlate with the extent of the established stress level. A settable unit may be, for example, a steering system or a braking system in the vehicle, which is configured with an actuator, for example an electric steering or braking motor, a parameter or a characteristic curve of the actuator being modified.

To compensate for a stress-induced, excessive driver input, it may be advantageous, for example, to implement the driver input only in a subdued or reduced manner. For example, a steering input of the driver may be translated into a smaller wheel steering angle at the steerable wheels than with a lower stress level, or the steering force assistance via the servo motor in the steering system is reduced. In addition or as an alternative, it is also possible to implement pedal actuations, i.e., an actuation of the brake or accelerator pedal, in a reduced or subdued manner, for example so that an accelerator pedal actuation results only in a lesser acceleration than in the less stressed condition of the driver.

Stress-reducing measures may also include modifying characteristic curves in a driver assistance system, if necessary, for example in an anti-lock braking system (ABS), in a traction control system (TCS), in an electronic stability program (ESP), in a brake assistance system or in a steering assistance system. These are driver-supporting functionalities in one or multiple units in the vehicle to set a desired vehicle behavior as a function of the situation. In the case of an increased stress level, it also possible, in addition or as an alternative to the aforementioned characteristic curve modification, to activate such a driver assistance system, for example a brake assistance system for initiating and automatically carrying out a braking process.

The exertion of influence on the characteristic curves may concern the driving safety on the one hand, and the driving comfort on the other hand. As described above, for example acceleration commands of the driver are only implemented in a reduced manner in the case of measures which concern driving safety. Measures which increase the driving comfort, for example a softer damping setting, may increase the well-being of the driver, and thus reduce the stress level, which also has a safety-increasing function.

To assess the stress level, it is possible to consider further characteristics or state variables which are either attributable to a driver actuation or which provide information about the driver's state of health, on a supplementary basis to the setpoint-actual comparison between the trajectory or a state variable correlating therewith. For example, the pedal actuation may be evaluated with respect to frequency, intensity and gradient since a high stress level results in an intensified pedal actuation. With the aid of measuring devices in the vehicle, it is also possible to ascertain health-relevant, driver-specific parameters, for example the heart rate, the blood pressure, or the breathing activity of the driver. Such information may be additionally used to ascertain the stress level.

The setpoint progression of the trajectory preferably represents that driving line which is to be driven with minimal steering effort. In corresponding fashion, it is also possible to determine the setpoint progression of the steering angle in such a way that minimal steering movements are required to drive on the ideal line. Accordingly, deviations in the actual progression of the trajectory or of the steering angle are particularly meaningful with regard to the stress level of the driver.

BRIEF DESCRIPTION OF THE DRAWING

The FIGURE shows a functional principle for ascertaining the stress level of the driver and for taking stress-reducing measures.

DETAILED DESCRIPTION

The FIGURE shows the flow principle for ascertaining the stress level and, proceeding therefrom, the execution of stress-reducing measures. A first block 1 symbolizes the ascertainment of the actual trajectory of the vehicle, i.e., of the actually covered driving route, which may be established, for example, with the aid of a navigation system and/or a surroundings sensor system. The navigation system includes a global positioning system (GPS) and a stored road map, from which the immediately preceding driving route may be ascertained proceeding from the instantaneous vehicle position. The immediately preceding driving route may also be established via the surroundings sensor system, for example with the aid of a video camera or a radar system. It is also possible to evaluate information from the navigation system and the surroundings sensor system together, whereby obstacles on the roadway may be detected, for example. The setpoint trajectory is the optimal driving route which the vehicle ideally covers.

In block 2, the actual trajectory, i.e., the driving maneuver which is actually carried out, is ascertained. This takes place, for example, also with the aid of the navigation system and/or the surroundings sensor system. However, in addition, it is also possible to ascertain the steering actuation of the driver, for example, with the aid of an on-board sensor system, and the actual trajectory may be inferred from this steering actuation. It is furthermore possible for a setpoint steering angle progression for a certain driving route to be ascertained in block 1, and for the measured actual steering angle progression from block 2 to be compared to the setpoint progression.

In block 3, the instantaneous stress level of the driver is ascertained from the comparison between the setpoint and actual progression from blocks 1 and 2. In this process, the deviations in the actual progression from the setpoint progression are ascertained, the deviations in terms of their magnitude and their number representing a degree of the instantaneous stress level of the driver. For example, the empirical variance may be ascertained mathematically, or the standard deviation may be ascertained from the root of the variance, the magnitude of the variance or of the standard deviation representing a degree of the instantaneous stress level of the driver.

In block 4, stress-reducing measures are taken in the vehicle. Depending on the extent of the ascertained stress level, measures may be carried out in a stepped manner. In the case of an only slightly increased stress level, it suffices to provide information or issue a warning to the driver, for example to the effect that the driver is urged to change the driving behavior or take a break. In a next higher level, which is carried out with an accordingly higher stress level, for example an intervention in a unit or an actuator in the vehicle is carried out by activating the unit or the actuator itself, or by changing a characteristic curve or a parameter of the unit or of the actuator. The extent of the intervention may, once again, be made dependent on the extent of the stress level. This procedure makes it possible to carry out a lesser intervention with a medium stress level, for example, than with a high stress level. It may be advantageous with a medium stress level, for example, to change a characteristic shock absorber curve toward a more comfortable driving behavior, and with an even higher stress level to change characteristic curves in a driver assistance system toward an earlier response behavior, for example so that an electronic stability program already intervenes sooner than with a low stress level. In the highest stage, in contrast, a unit or driver assistance system is automatically triggered directly, for example a steering or a braking process is carried out automatically.

The method for ascertaining the stress level and, dependent thereon, for taking stress-reducing measures may be carried out at regular intervals. This makes it possible to ascertain changes in the stress level and to adapt the measures to be taken both to an increasing and to a reducing stress level.

What is claimed is:

1. A method for ascertaining a stress level of a driver of a vehicle, comprising:
   determining one of a setpoint trajectory of the vehicle and a state variable correlating with the setpoint trajectory;
   comparing the one of the setpoint trajectory and the state variable respectively to at least one of an actual trajectory and a state variable correlating with the actual trajectory;
   inferring a higher stress level from an increasing driver reaction, wherein the increasing driver reaction includes at least one of an increasing frequency and a magnitude of a deviation of one of the actual trajectory from the setpoint trajectory and the state variable correlating with the setpoint trajectory from the state variable correlating with the actual trajectory; and
   taking a stress-reducing measure as a function of the stress level.

2. The method as recited in claim 1, wherein the setpoint and actual trajectories, or state variables correlating therewith, are determined together in the transverse and longitudinal directions and compared.

3. The method as recited in claim 1, wherein a variance is ascertained from the difference between the actual and the setpoint trajectory, or the correlating state variable, the variance being used as a measure of the stress level.

4. The method as recited in claim 3, wherein a weighted sum of variances of multiple state variables is used as a measure of the stress level.

5. The method as recited in claim 1, further comprising:
   comparing setpoint and actual progressions of a steering angle.

6. The method as recited in claim 1, wherein the setpoint trajectory, or the state variable correlating therewith, is determined from measuring data of a surroundings sensor system in the vehicle.

7. The method as recited in claim 1, wherein the setpoint trajectory represents that driving line which is to be driven with minimal steering effort.

8. The method as recited in claim 1, wherein driver inputs including steering inputs or pedal actuations are implemented in a reduced manner as the stress-reducing measure.

9. The method as recited in claim 1, wherein characteristic curves in a vehicle unit or a driver assistance system are modified in a brake assistance system as the stress-reducing measure.

10. The method as recited in claim 9, wherein characteristic curves are changed for the benefit of a higher driving comfort as the stress-reducing measure.

11. The method as recited in claim 1, wherein the higher stress level is inferred additionally based on an intensified pedal actuation by the driver.

12. A control unit for carrying out a method for ascertaining a stress level of a driver of a vehicle, the method comprising:
    determining one of a setpoint trajectory of the vehicle and a state variable correlating with the setpoint trajectory;
    comparing the one of the setpoint trajectory and the state variable respectively to at least one of an actual trajectory and a state variable correlating with the actual trajectory;
    inferring a higher stress level from an increasing driver reaction, wherein the increasing driver reaction includes at least one of an increasing frequency and a magnitude of a deviation of one of the actual trajectory from the setpoint trajectory and the state variable correlating with the setpoint trajectory from the state variable correlating with the actual trajectory; and
    taking a stress-reducing measure as a function of the stress level.

13. A driver assistance system in a vehicle, comprising:
    a control unit for carrying out a method for ascertaining a stress level of a driver of a vehicle, the method comprising:
       determining one of a setpoint trajectory of the vehicle and a state variable correlating with the setpoint trajectory;
       comparing the one of the setpoint trajectory and the state variable respectively to at least one of an actual trajectory and a state variable correlating with the actual trajectory;
       inferring a higher stress level from an increasing driver reaction, wherein the increasing driver reaction includes at least one of an increasing frequency and a magnitude of a deviation of one of the actual trajectory from the setpoint trajectory and the state variable correlating with the setpoint trajectory from the state variable correlating with the actual trajectory; and
       taking a stress-reducing measure as a function of the stress level.

14. The system as recited in claim 13, wherein the setpoint and actual trajectories, or state variables correlating therewith, are determined together in the transverse and longitudinal directions and compared.

15. The system as recited in claim 13, wherein the variance is determined from a sum of the deviations from a mean value squared, as follows:

$$s^2 = \frac{1}{n-1} \sum_{i=1}^{n} (x_i - \bar{x})^2,$$

where n denotes the number of data points, $x_i$ denotes a respective data value, and $\bar{x}$ denotes a mean value of the data.

16. The system as recited in claim 15, wherein a weighted sum of variances of multiple state variables is used as a measure of the stress level.

17. The system as recited in claim 13, wherein setpoint and actual progressions of a steering angle are compared.

18. The system as recited in claim 13, wherein the setpoint trajectory, or the state variable correlating therewith, is determined from measuring data of a surroundings sensor system in the vehicle.

19. The system as recited in claim 13, wherein the setpoint trajectory represents that driving line which is to be driven with minimal steering effort.

20. The system as recited in claim 13, wherein driver inputs including steering inputs or pedal actuations are implemented in a reduced manner as the stress-reducing measure.

21. The system as recited in claim 13, wherein characteristic curves in a vehicle unit or a driver assistance system are modified in a brake assistance system as the stress-reducing measure.

22. The system as recited in claim 21, wherein characteristic curves are changed for the benefit of a higher driving comfort as the stress-reducing measure.

23. The system as recited in claim 13, wherein the higher stress level is inferred additionally based on an intensified pedal actuation by the driver.

24. The system as recited in claim 13, wherein a variance is ascertained from the difference between the actual and the setpoint trajectory, or the correlating state variable, the variance being used as a measure of the stress level.

25. The control unit as recited in claim 12, wherein a variance is ascertained from the difference between the actual and the setpoint trajectory, or the correlating state variable, the variance being used as a measure of the stress level.

* * * * *